US007253747B2

(12) United States Patent
Noguchi

(10) Patent No.: US 7,253,747 B2
(45) Date of Patent: Aug. 7, 2007

(54) PARKING LOT MANAGEMENT SYSTEM USING WIRELESS LAN SYSTEM

(75) Inventor: Kazushige Noguchi, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 115 days.

(21) Appl. No.: 10/808,243

(22) Filed: Mar. 25, 2004

(65) Prior Publication Data

US 2005/0057373 A1 Mar. 17, 2005

(30) Foreign Application Priority Data

Sep. 11, 2003 (JP) ............................ 2003-319317

(51) Int. Cl.
*B60Q 1/48* (2006.01)

(52) U.S. Cl. .................. 340/932.2; 340/933; 340/942; 705/13

(58) Field of Classification Search ............ 340/932.2, 340/933, 942; 705/13
See application file for complete search history.

(56) References Cited

U.S. PATENT DOCUMENTS 5,748,107 A * 5/1998 Kersken et al. ............. 340/905
6,147,624 A * 11/2000 Clapper ................... 340/932.2
6,340,935 B1 * 1/2002 Hall ........................ 340/932.2
6,405,125 B1 * 6/2002 Ayed .......................... 701/200
6,646,568 B2 * 11/2003 MacPhail et al. ........ 340/932.2
6,694,258 B2 * 2/2004 Johnson et al. ............. 701/213
6,816,085 B1 * 11/2004 Haynes et al. ........... 340/932.2
6,862,443 B2 * 3/2005 Witte ......................... 455/345
6,865,539 B1 * 3/2005 Pugliese, III .................. 705/5
6,885,312 B1 * 4/2005 Kirkpatrick .............. 340/932.2
6,917,307 B2 * 7/2005 Li ........................... 340/932.2
6,946,974 B1 * 9/2005 Racunas, Jr. ............. 340/932.2
2004/0212519 A1 * 10/2004 Nelson et al. ........... 340/932.2
2004/0252034 A1 * 12/2004 Slemmer et al. ......... 340/932.2

FOREIGN PATENT DOCUMENTS

JP 2002-109693 4/2002
JP 2002-318959 10/2002

* cited by examiner

*Primary Examiner*—Benjamin C. Lee
*Assistant Examiner*—Travis R. Hunnings
(74) *Attorney, Agent, or Firm*—Rabin & Berdo, PC

(57) ABSTRACT

In a parking lot management system, which is applied to a parking lot having a plurality of parking spaces, information about parking is wirelessly communicated between a plurality of wireless LAN base stations connected to an interface part and then connected to the Internet, and a plurality of parking condition detection devices or a wireless LAN mobile station installed in a mobile object. The information is managed by a server via an IP network so that the parking lot management system can provide the information for a user who is in the parking lot.

25 Claims, 7 Drawing Sheets

PARKING LOT MANAGEMENT SYSTEM USING WIRELESS LAN SYSTEM

BACKGROUND OF THE INVENTION

1) Field of the Invention

The present invention relates to a parking lot management system which provides information about a parking lot. The parking lot management system uses a wireless LAN (Local Area Network) system.

2) Description of the Related Art

A service is known which offers information about availability of parking spaces. The service uses a server to manage information and an on-vehicle communication apparatus connected to the server via the Internet. Japanese Patent Kokai No. 2002-109693 discloses a system which has a function to distribute real time information about availability of parking lots near an area designated by a user. The system uses an unattended parking lot management facility equipped with an availability information notification function, and a server to manage availability information supplied from the unattended parking lot management facility. Accordingly, the system distributes the information to the on-vehicle communication apparatus having capability to access to the Internet. The unattended parking lot management facility is provided with, for example, a vehicle information management device which detects the number of vehicles parked in each parking lot by an associated sensor. If the parking lot has an available space, the vehicle information management device transmits the information to an availability information management server via the Internet.

Another type of information providing system is disclosed in Japanese Patent Kokai No. 2002-318959, which includes a center server and a communication terminal installed at a store. The communication terminal is connected to the center server via a communication network. The center server stores availability information supplied from the communication terminal at the store, and then transmits the availability information to a user's communication terminal having capability to access to the Internet. This system may be used to provide the information about the availability of a parking space. For instance, the system can provide information about an availability of a parking lot near the designated railway station and the number of available spaces in the parking lot.

There is provided a service such that the general public can wirelessly connect to the Internet by means of a notebook computer or a personal digital assistants (PDA). The service is established by a wireless LAN system which has an installed base station for transmitting and receiving data by wireless communication. Such wireless LAN system complies with communication standards. Among them, the IEEE (Institute of Electrical and Electronics Engineers) 802.11b is generally applied. Alternatively, the IEEE 802.11a , the Bluetooth or the like may be applied.

As an example of such service using the wireless LAN system, there is a "hotspot" service which has a wireless network installed at areas where many people gather such as coffee shops, restaurants, hotels, convenience stores, airports and railway stations, so that these people can use the Internet. It should be noted that the term "hotspot" is a registered trademark of the NTT Communications Corporation, Tokyo, Japan (Japanese Registered Trademark No. 4539387), even though it is used to express the above-described service. This "hotspot" service is achieved in such a manner that a large company, e.g., the NTT Communications Corporation, installs a system at a store or the like who ties up with the company, and then the store owner himself or a railway company installs a commercially available wireless LAN system at the store, train or station so that customers can use the system.

When the scale of the store or the number of customers is large, a large parking space is required for a parking lot. In some cases, a plurality of floors are required for such parking lot. A customer who will use such parking lot may be able to recognize whether the parking space is available or not before entering the parking lot. However, once the customer enters the parking lot, it is often difficult for the customer to smoothly park the vehicle, because the parking lot may be too large to find out the available space.

The systems disclosed in Japanese Patent Kokai No. 2002-109693 and Japanese Patent Kokai No. 2002-318959 can detect a parking lot having an available space and can provide a customer with information about such parking lot. However, these systems can not provide a customer with information to help the customer easily find a vacant space in the parking lot.

Furthermore, these systems are based on the assumption that a telephone line mainly accessed by a mobile phone is used to connect to the Internet. A communication speed of such application is thus too slow for the moving vehicle to obtain the parking lot information. Moreover, the moving vehicle sometimes can not receive a radio wave properly.

When the wireless LAN system such as the 'hotspot' is applied to the systems disclosed in Japanese Patent Kokai No. 2002-109693 or Japanese Patent Kokai No. 2002-318959, countless number of base stations are required, and therefore the wireless LAN system can not be used. This is because the system is not used in a limited area such as a railway station or a store, but the system is used in an unlimited area such as a road around the railway station.

SUMMARY OF THE INVENTION

An object of the present invention is to provide a parking lot management system which uses a wireless LAN system so as to provide information about a parking lot to a customer who is in the parking lot.

A parking lot management system according to a first aspect of the present invention includes a sever for managing parking information about a parking lot having a plurality of parking spaces, and a plurality of wireless LAN base stations installed in the parking lot for wirelessly transmitting and receiving the parking information. Each of the plurality of wireless LAN base stations has a transmittable and receivable area. The plurality of wireless LAN base stations form a wireless LAN system such that each of the plurality of wireless LAN base stations can wirelessly connect to a wireless LAN mobile station of a mobile object when the mobile object exists in its own transmittable and receivable area. The parking lot management system also includes communication means for communicating the parking information between the plurality of wireless LAN base stations and the server via an IP network operating with internet protocol. The wireless LAN mobile station and the server can communicate the parking information through the wireless LAN system and the communication means.

Information about the parking space is transmitted and received by the wireless LAN system within the parking lot. Accordingly, an available parking space can be easily found by a customer. This is especially effective for such a parking lot that has many parking spaces or is fully occupied.

Furthermore, the parking lot management system can register a parked vehicle position and can easily obtain vehicle position information by using the wireless LAN system. Accordingly, it is not necessary for a customer to remember the parking space when leaving the vehicle. Information about parking such as a parking time and a parking fee can be easily obtained by a measurement of an entering time or an exiting time. Since information about parking such as a vehicle position and a parking time can be easily obtained by the parking lot management system, a customer can do his own business (e.g., enjoy shopping) without worrying about the information about parking.

Since the parking lot management system of the present invention uses the wireless LAN system having a fast communication speed, even a moving vehicle can obtain real time information about parking.

DETAILED DESCRIPTION OF THE INVENTION

Figure 1:
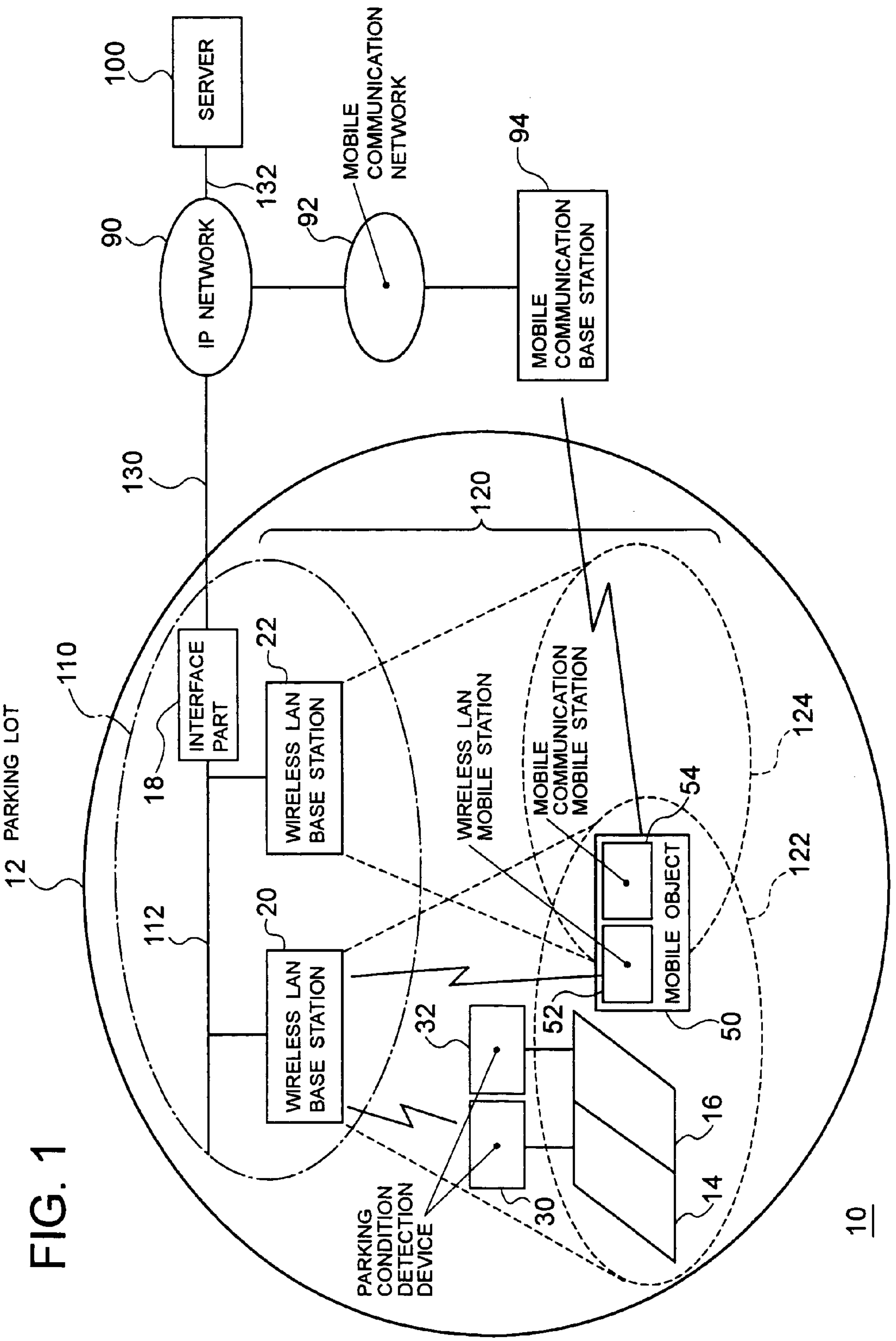
FIG. 1 shows a system configuration and connecting relationship within the system of an embodiment of a parking lot management system according to the present invention.

An embodiment of a parking lot management system using a wireless LAN system of the present invention will be described in detail with reference to the accompanied drawings. Referring to FIG. 1, there is shown an embodiment of the parking lot management system 10 according to the present invention. A parking lot 12 has a plurality of parking spaces 14 and 16. Information about the parking lot is managed by a server 100 via an IP (Internet Protocol) network 90. The information is wirelessly communicated to a plurality of parking condition detection devices 30 and 32, or a wireless LAN mobile station 52 installed on a mobile object 50 by means of a plurality of wireless LAN base stations 20 and 22 connected to an interface part 18. The interface part 18 is connected to the Internet. A mobile communication mobile station 54 installed in the mobile object 50 wirelessly communicates with a mobile communication network 92 connected to the IP network 90 via a mobile communication base station 94. It should be noted that any parts not directly necessary for understanding the present invention are omitted from FIG. 1 and will not be described here.

Although the parking lot 12 actually has a large number of parking spaces, only two parking spaces 14 and 16 are shown in FIG. 1 for the sake of simplicity. The parking lot 12 may have a multi-floor structure. In this case, each floor may include a plurality of parking spaces.

In the parking lot 12, a plurality of wireless LAN base stations 20 and 22 are provided to cover the whole area of the parking lot, and are connected to the interface part 18 via a connection line 112 such as a LAN cable. Accordingly, a parking lot LAN 110 is established. In this embodiment, the parking lot 12 is divided into many zones. Wireless LAN base stations equal in number to the zones of the parking lot are respectively installed at these zones so as to communicate wirelessly. Although only two wireless LAN base stations 20 and 22 are shown in FIG. 1 for the sake of simplicity, many wireless LAN base stations are actually installed. Alternatively, the interface part 18 may be connected to the wireless LAN base stations 20 and 22 by a wireless LAN. In the following description, each signal is specified by a reference numeral of a line on which that signal appears.

The interface part 18 is able to connect the wireless LAN base stations 20 and 22 to the IP network 90, and controls signals transmitted between the wireless LAN base stations and the IP network. The interface part 18 may be, for example, a router for external connection.

The wireless LAN base stations 20 and 22 wirelessly transmit signals supplied from the IP network 90 via the interface part 18, as well as receive wireless signals supplied from the wireless LAN mobile station 52 installed in the mobile object 50 and the parking condition detection devices 30 and 32. Accordingly, a wireless LAN system 120 is established. In this embodiment, the wireless LAN base stations 20 and 22 transmit wireless signals in respective areas 122 and 124 which encompass the corresponding zones in the parking lot. Accordingly, each wireless LAN base station 20 (22) communicates with, for example, a predetermined number of parking condition detection devices 30 and 32.

The wireless LAN base stations 20 and 22 may also detect the position of the wireless LAN mobile station 52 based on information such as an intensity or a phase of a radio wave in wireless signals which are transmitted to and received from the wireless LAN mobile station 52. The wireless LAN base stations 20 and 22 may add such positional information to an output signal to the IP network 90.

The parking condition detection devices 30 and 32 are respectively installed at the parking spaces 14 and 16. Although many parking condition detection devices are actually installed, only two parking condition detection devices 30 and 32 are shown in FIG. 1 in order to avoid complex illustration. These parking condition detection devices are respectively installed at the parking spaces (not shown).

Figure 2:
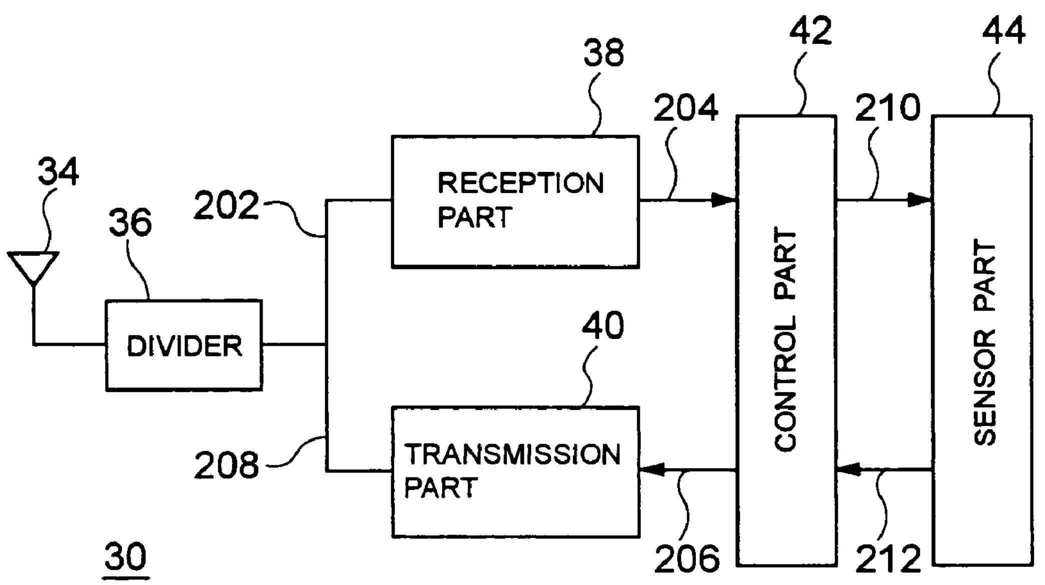
FIG. 2 is a block diagram showing detail of a parking condition detection device included in the embodiment of the parking lot management system shown in FIG. 1.

As shown in FIG. 2, the parking condition detection device 30 includes a transmission and reception antenna 34, a divider 36, a reception part 38, a transmission part 40, a control part 42, and a sensor part 44 so as to detect a parking condition of the corresponding parking space 14, i.e., whether the parking space 14 is occupied by a vehicle or not. The detection device 30 transmits a signal showing the parking condition.

The transmission and reception antenna 34 is a linear antenna which effectively receives a wireless signal from the wireless LAN base station 20, and transmits the above-described parking condition signal toward the wireless LAN base station 20. Thus, the transmission and reception antenna 34 has both transmission and reception functions. The divider 36 has a function to separate a signal 202 received by the antenna 34 from a signal 208 supplied from the transmission part 40 so as to permit simultaneous connections. The divider 36 can independently transmit the signals to each part of the detection device.

The reception part 38 processes the reception signal 202 and outputs the processed signal to the control part 42. The transmission part 40 processes a transmission signal 206 and outputs the processed signal to the divider 36.

The control part 42 outputs a control signal 210 for controlling the sensor part 44 in accordance with a reception signal 204. The control part 42 also controls a detection signal 212 from the sensor part 44, and outputs the transmission signal 206. The sensor part 44 has a function to detect whether the parking space 14 is occupied by a vehicle or not. This detection is achieved by, for example, an optical sensor, a weight sensor, an acoustic wave sensor, or an electric wave sensor. The sensor part 44 outputs a signal 212 showing the parking condition which results from the detection.

The parking condition detection devices 30 and 32 of this embodiment respectively have identification information of the corresponding paring spaces 14 and 16, so that the parking condition detection devices 30 and 32 follow instructions of the received wireless signal only if identification information included in the wireless signal matches the identification information of the parking condition detection device. When the parking condition detection device transmits a wireless signal to the wireless LAN base station, the detection device wirelessly transmits the signal accompanied by the identification information. The identification information may be, for example, an unique number assigned to the individual parking space, or a coordinate showing the position of the parking space.

Figure 3:
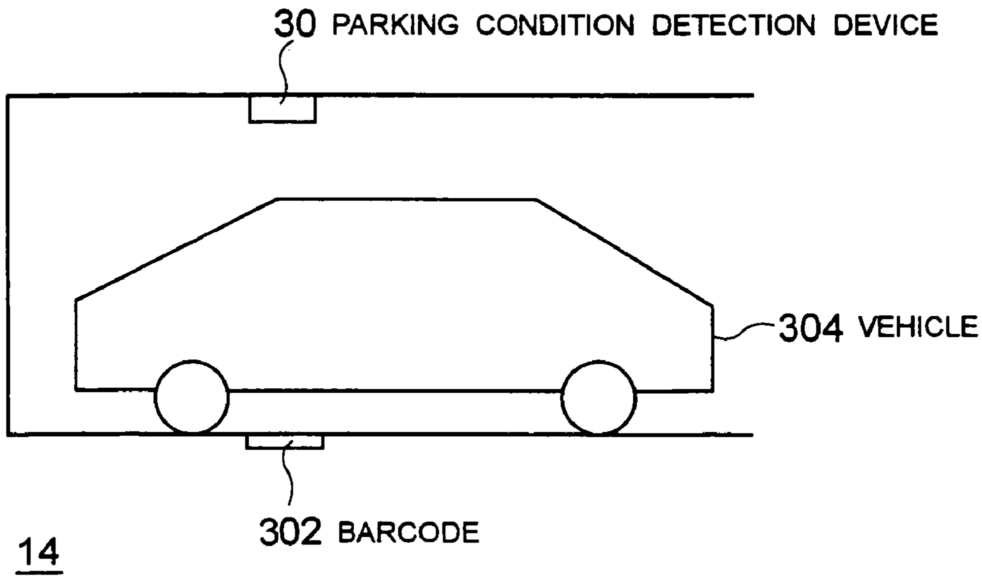
FIG. 3 is a schematic drawing of a parking space included in the embodiment of the parking lot management system shown in FIG. 1.

In this embodiment, for example, as shown in FIG. 3, the parking condition detection device 30 is provided at the higher section of the parking space 14, and a barcode 302 is provided at the upper section of the parking space 14. The sensor part 44 of the parking condition detection device 30 uses an optical sensor which reads the barcode 302. Accordingly, when the sensor part 44 is able to read the barcode 302, such determination is made that no vehicle 304 is parked in the parking space 14. On the other hand, when the sensor part 44 is not able to read the barcode 302, such determination is made that a vehicle 304 is parked in the parking space 14. From the result of the determination, the parking condition at the parking space 14 can be detected. The sensible object provided at the lower section of the parking space 14 is not limited to the barcode 302. For example, a human-readable character such as a letter or a sign may be provided so as to be read by the optical sensor. Furthermore, the barcode, the letter or the sign may include the identification information of the parking space 14 so as to be read by the optical sensor.

In this embodiment, the mobile object 50 in the parking lot 12 may be a mobile phone, a PHS (Personal Handy-Phone System) or the like having the wireless LAN mobile station 52 and the mobile communication mobile station 54.

The wireless LAN mobile station 52 in this embodiment has a function to wirelessly transmit and receive the parking information to and from the wireless LAN base stations 20 and 22. The wireless LAN mobile station 52 may be detachable from the mobile object 50. The wireless LAN mobile station 52 has unique identification information so as to follow instructions of a wireless signal only if the identification information included in the received wireless signal matches the unique identification information of the station. The wireless LAN mobile station 52 wirelessly transmits a signal accompanied by the identification information when transmitting the wireless signal.

In this embodiment, the wireless LAN mobile station 52 transmits a signal demanding information presentation of the parking condition and/or the position of the vehicle (referred to as "information presentation demanding signal") to the wireless LAN base station, and also receives a reply signal showing the parking condition and/or the position of the vehicle from the wireless LAN base station. The wireless LAN mobile station 52 periodically transmits the information presentation demanding signal so that the server supplies the reply signal in response to each information presentation demanding signal. Alternatively, the wireless LAN mobile station 52 may transmit the information presentation demanding signal only once at the beginning of the operation and the server may periodically supply the reply signals. The information presentation demanding signals are kept being transmitted from the wireless LAN mobile station 52, until the parking is completed or the mobile object is operated to stop sending the information presentation demanding signal.

The mobile communication mobile station 54 is able to connect to the mobile communication base station 94 of the mobile communication network 92 via the wireless communication.

The IP network 90 complies with the TCP/IP (Transmission Control Protocol/Internet Protocol), and is mainly applied to a wide-area network. A terminal connected to the IP network 90 is identified by its IP address. Therefore, an IP packet transmitted through the IP network 90 is transmitted to the designated terminal based on the IP address attached to the header of the IP packet. The IP network 90 may be not only the Internet but also any network performing the packet transmission using the IP address. In this embodiment, the IP network 90 is connected to the interface part 18, the mobile communication network 92 and the server 100.

The mobile communication network 92 may be, for example, a packet communications network provided by a communication carrier, and is connected to the IP network 90 via a Gateway server or the like (not shown). The mobile communication network 92 is further connected to a plurality of the mobile communication base stations 94. Although many mobile communication base stations are actually installed, only one mobile communication base station 94 is shown in FIG. 1 of this embodiment for the sake of simplicity. The mobile communication base stations 94 may be able to transmit and receive wireless signals within the respective local areas. Specifically, the mobile communication base station 94 may communicate the wireless signal with the mobile communication mobile station 54 in the mobile object 50 which exists in the corresponding area.

Figure 4:
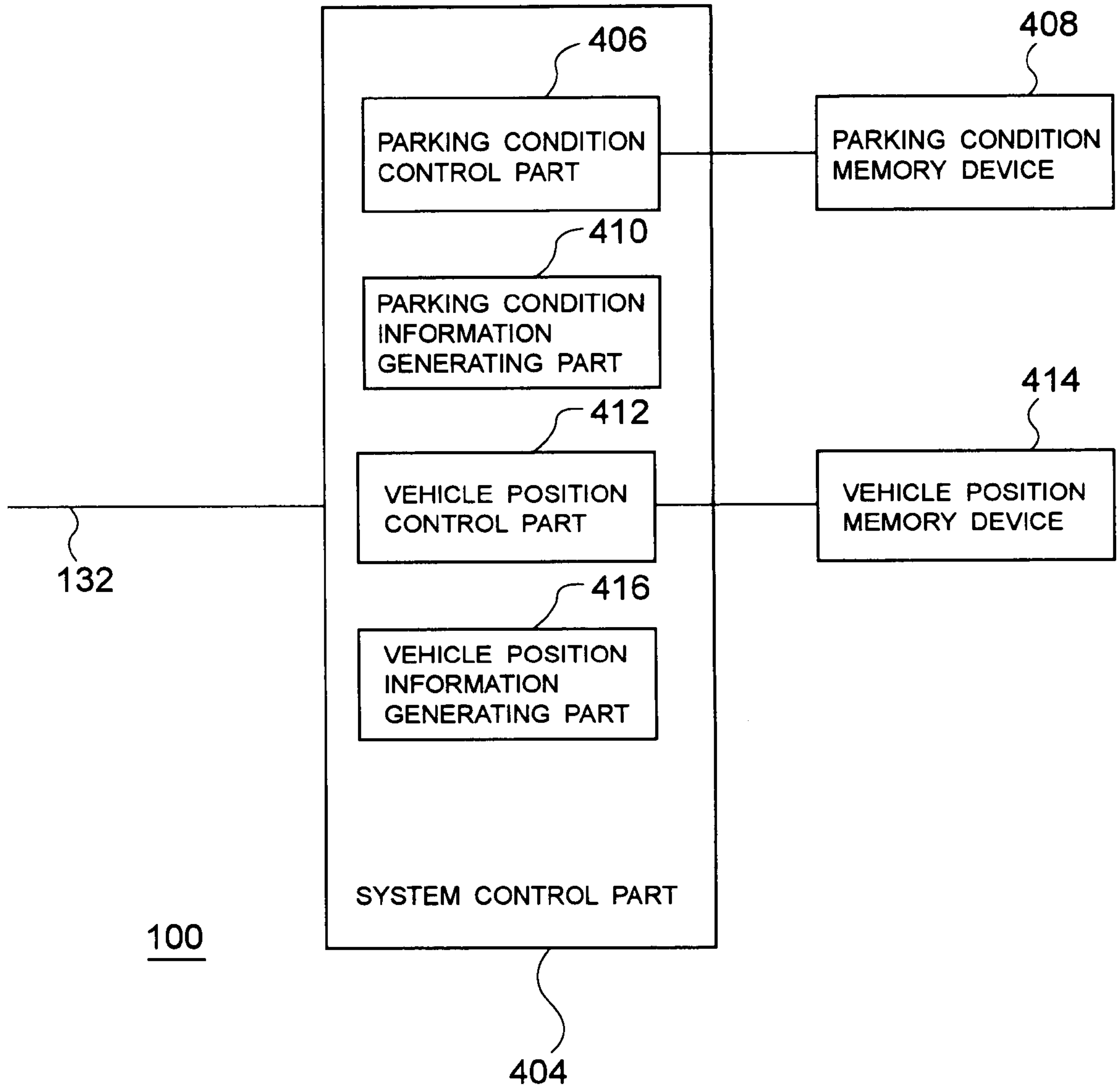
FIG. 4 is a block diagram showing detail of a server included in the embodiment of the parking lot management system shown in FIG. 1.

The server 100 is connected to the IP network 90 and has a function to manage the system of this embodiment. In this embodiment, as shown in FIG. 4, the server 100 includes a system control part 404 so as to control and manage the operation of the overall system. The system control part 404 includes a parking condition control part 406 and a parking condition information generating part 410 so as to control a parking condition signal, and is connected to a parking condition memory device 408. The system control part 404 further includes a vehicle position control part 412 and a vehicle position information generating part 416 so as to control a vehicle position signal, and is connected to a vehicle position memory device 414.

With respect to information about the parking lot 12 (i.e., the zones of the parking lot 12, the wireless LAN base stations corresponding to the zones of the parking lot, and the parking spaces and the parking condition detection devices communicated with the corresponding wireless LAN base station), the system control part 404 grasps their positional relationship, and stores their identification information. Accordingly, information about the parking lot such as a location of a particular item (e.g., zone) and its identification information near a designated position can be obtained.

The parking condition control part 406 has a function to periodically output signals demanding detection of a parking condition to the parking condition detection devices 30 and 32. The parking condition control part 406 also has a function to categorize parking condition signals supplied from the parking condition detection devices 30 and 32 based on identification information of the corresponding parking spaces, and to output the categorized signals to the parking condition memory device 408. Furthermore, the parking condition control part 406 has a function to extract a parking condition signal from the parking condition memory device 408 based on identification information of a designated parking space.

The parking condition memory device 408 has a function to memorize and manage the parking condition signal per each parking space. In this embodiment, a searchable database or the like is used to extract the parking condition signal based on the identification information of the designated parking space.

The parking condition information generating part 410 generates a signal showing the parking condition and outputs the signal to the wireless LAN mobile station in response to the received parking condition information presentation demanding signal. The parking condition information generating part 410 confirms (detects) the position of the wireless LAN mobile station supplying the information presentation demanding signal based on the parking condition information demanding signal, and recognizes the position of the mobile object transmitting the information presentation demanding signal.

In the system control part 404, a certain number of parking spaces around a position of the mobile object can be detected based on the position of the mobile object, and identification information of the parking spaces can be obtained. In the parking condition control part 406 of the system control part 404, parking condition signals of the parking spaces around the position of the mobile object can be extracted based on the identification information of the parking spaces.

In the parking condition information generating part 410, a parking condition information (presentation) signal is generated so as to show the extracted parking condition signals to the mobile object. This parking condition information signal may be generated as a voice signal and/or an image signal.

Generation of the parking condition information signal by the parking condition information generating part 410 may be achieved by confirming (determining) the position of the wireless LAN base station based on the information presentation demanding signal, and by extracting the parking condition signals around the wireless LAN base station, i.e., within the zone of the parking lot.

The vehicle position control part 412 has a function to output a signal requesting a registration of the vehicle position to the wireless LAN mobile station 52 in the mobile object 50 which completes the parking. The vehicle position control part 412 also has a function to categorize a vehicle position signal supplied from the wireless LAN base station 52 based on the identification information of the wireless LAN base station 52, and to output the categorized signal to the vehicle position memory device 414. Furthermore, the vehicle position control part 412 has a function to extract the vehicle position signal from the vehicle position memory device 414 based on the identification information of the designated wireless LAN mobile station 52.

The vehicle position memory device 414 has a function to memorize and manage the vehicle position signal per each wireless LAN mobile station or per each vehicle. In this embodiment, a searchable database or the like is used to extract the vehicle position signal based on the identification information of the designated wireless LAN mobile station.

The vehicle position information generating part 416 has a function to generate a signal of the vehicle position information in response to a vehicle position information demanding signal supplied from the wireless LAN mobile station 52, and outputs the information (presentation) signal to the wireless LAN mobile station 52.

In the vehicle position information generating part 416, when an information demand signal is supplied from the wireless LAN mobile station 52, a position of the wireless LAN base station supplying the information demand signal is confirmed (determined) based on the identification information of the wireless LAN mobile station 52 included in the information demand signal, and the position of the mobile object transmitting the information demand signal is recognized. The identification information is input to the vehicle position control part 412 so as to extract the vehicle position signal from the vehicle position memory device 414.

A person who carries the mobile object (e.g., cell phone) may walk away from the parked vehicle. In the vehicle position information generating part 416, an information signal (information presentation signal) is generated so as to show the vehicle position relative to the position of the mobile object to the mobile object. This information signals may be generated as a voice signal and/or an image signal. Furthermore, the actual vehicle position may be indicated (illuminated) by outputting a guide signal which controls a lighting system (not shown) at the parking space of the vehicle position, and by turning on the lighting system provided at the parking space.

Generation of the guide signal by the vehicle position information generating part 416 may be achieved by confirming (determining) the position of the wireless LAN base station based on the information demand signal (guide demand signal), and by extracting the target vehicle position from a plurality of vehicle positions around the wireless LAN base station, i.e., within the zone of the parking lot.

Figure 5:
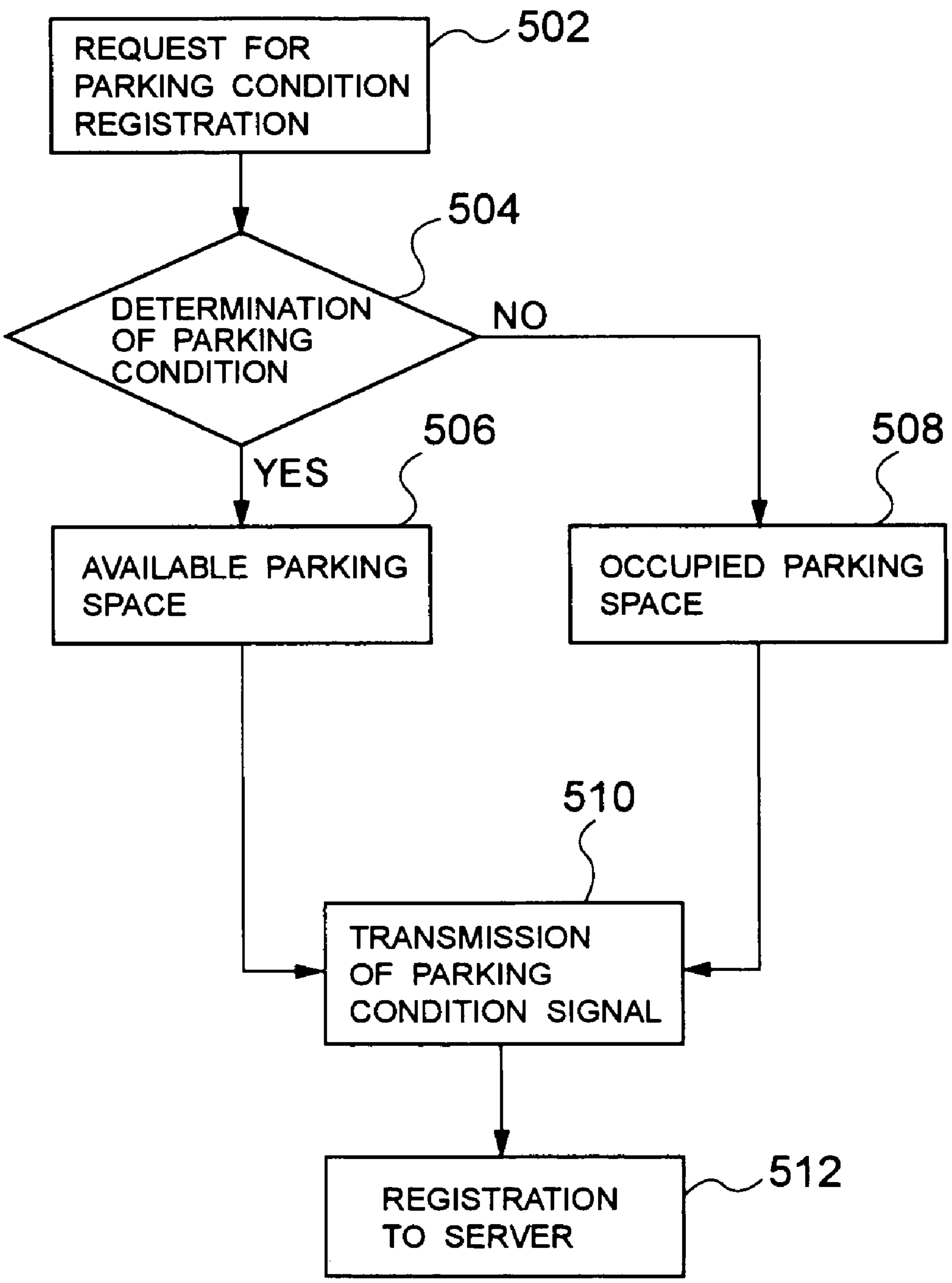
FIG. 5 is a flowchart illustrating an operating procedure to register a parking condition in the embodiment of the parking lot management system shown in FIG. 1.

An operation of the system in this embodiment will be described. This system 10 can register the parking condition to the server 100, and can request the information of the registered parking condition to the server 100 by using the wireless LAN system 120. Firstly, by referring to a flowchart in FIG. 5, an operation of the system to register the parking condition signal will be described.

In the server 100 of the system 10, request signals demanding registration of signals showing the parking conditions of the parking spaces are transmitted from the parking condition control part 406 in the system control part 404 to the parking condition detection devices 30 and 32 (step 502). In this embodiment, the parking condition registration request signal is supplied to the parking condition detection devices as described above. Alternatively, the parking condition registration request signal may be supplied to designated parking lot zone(s), the wireless LAN base station(s), or the parking condition detection device(s) only. The request signal 132 is output from the server 100 and supplied to the interface part 18 of the parking lot 12 via the IP network 90.

In the parking lot 12, the parking condition registration request signal 130 to the interface part 18 is supplied to the wireless LAN base stations 20 and 22 via the connection line 112. From the wireless LAN base stations 20 and 22, this request signal is wirelessly transmitted. Specifically, the request signal transmitted from the wireless LAN base station 20 is received by the parking condition detection devices 30 and 32 installed within the transmittable and receivable area 122.

As shown in FIG. 2, for example, in the parking condition detection device 30, the request signal is received by the transmission and reception antenna 34. The request signal 204 is then supplied to the control part 42 via the divider 36 and the reception part 38. In the control part 42, the control signal 210 is output in response to the request signal 204 so as to control the sensor part 44.

As shown in FIG. 3, for example, the sensor part 44 of the parking condition detection device 30 determines the parking condition which shows either the parking space 14 is occupied by the vehicle 304 or not (step 504). In this embodiment, the sensor part 44 emits a detection signal which reads the barcode 302 at the parking space 14. When the barcode 302 can be read, it is determined that the parking space 14 is available (step 506). On the other hand, when the barcode 302 can not be read, it is determined that the parking space 14 is occupied by the vehicle (step 508).

Accordingly, when it is determined that the parking space 14 is available, the sensor part 44 and the control part 42 generate the parking condition signal 206 showing the available parking space. On the other hand, when it is determined that the parking space 14 is occupied by the vehicle, the sensor part 44 and the control part 42 generate the parking condition signal 206 showing the occupied parking space. In both cases, the identification information of the parking space 14 is attached to the parking condition signal 206, and the parking condition signal 206 is transmitted from the transmission and reception antenna 34 via the transmission part 40 and the divider 36 (step 510).

The parking condition signal transmitted from the parking condition detection device 30 is received, for example, by the wireless LAN base station 20. From the wireless LAN base station 20, the parking condition signal is output to the IP network 90 via the connection line 112 and the interface part 18. This parking condition signal 130 is supplied to the server 100 via the IP network 90.

In the server 100, the parking condition signal 132 is supplied to the system control part 404, and then supplied to the parking condition control part 406. In the parking condition control part 406, the parking condition signal is independently stored based on the identification information of the parking space 14 included in the parking condition signal. Accordingly, the parking condition signal is registered to the parking condition memory device 408 (step 512).

Figure 6:
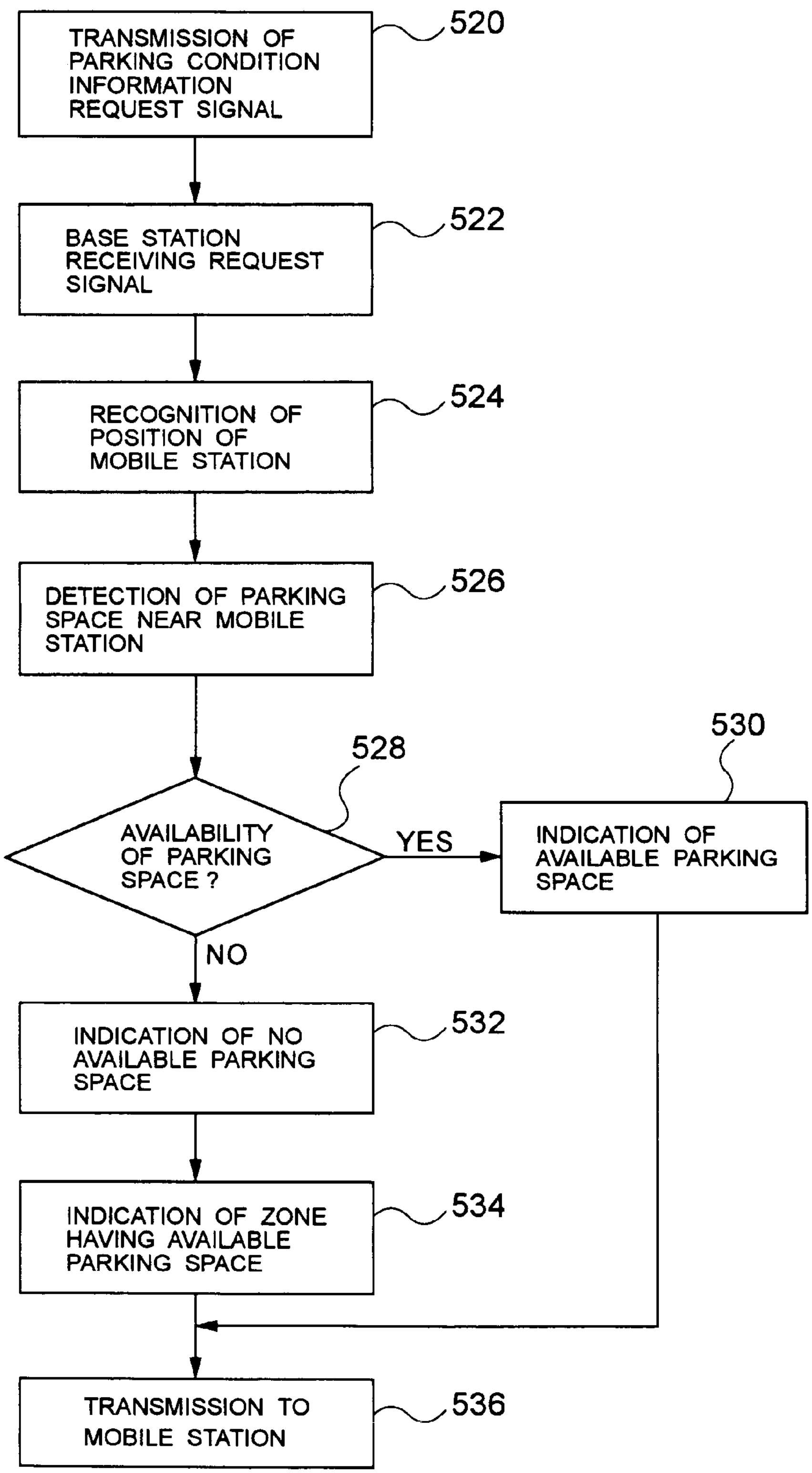
FIG. 6 is a flowchart illustrating an operating procedure to obtain parking space information in the embodiment of the parking lot management system shown in FIG. 1.

Next, by referring to a flowchart in FIG. 6, an operation of the system 10 to provide the parking condition information will be described.

In the system 10, a signal requesting information of the parking condition is wirelessly transmitted, for example, from the wireless LAN mobile station 52 in the mobile object 50 which exists in the parking lot 12 (step 520).

In this embodiment, the parking condition information request signal is received by the wireless LAN base station 20 located near the wireless LAN mobile station 52 (step 522).

From the wireless LAN base station 20, the request signal is output to the IP network 90 via the connection line 112 and the interface part 18. This request signal 130 is supplied to the server 100 via the IP network 90.

In the server 100, the parking condition information request signal 132 is supplied to the system control part 404. The location of the wireless LAN base station 20 within the parking lot 12 is then confirmed (determined), and the location of the wireless LAN mobile station 52 is recognized (step 524).

The parking condition information generating part 410 of the system control part 404 in this embodiment selects a certain number of parking spaces near the position of the wireless LAN mobile station 52 among many parking spaces based on the recognized location of the wireless LAN mobile station 52, and detects the identification information of the parking spaces (step 526).

Based on the identification information of the parking spaces, a certain number of parking condition signals are extracted from the parking condition memory device 408 to the parking condition control part 406. In the parking condition information generating part 410, whether a parking space is available or not is determined based on the parking condition signals (step 528).

In the parking condition information generating part 410, when it is determined that the parking space is available, the parking condition information signal which indicates an available parking space near the wireless LAN mobile station 52 is generated (step 530). On the other hand, when it is determined that no parking space is available, the information signal indicating no available parking space near the wireless LAN mobile station 52 is generated (step 532).

Specifically, in the case of step 530, a voice signal saying "There is an available parking space within 10 m" may be generated and supplied to the mobile object 50. On the other hand, in the case of step 532, a voice signal saying "There is no available parking space near here. Please find a parking space in another location" may be generated and supplied to the mobile object 50.

In the case of step 532, the information signal which indicates a parking lot zone having an available parking space is generated in the parking condition information generating part 410 (step 534). In this case, a voice signal saying "XX area has relatively many available parking spaces" may be, for example, generated after detecting the parking lot zone having the available parking space.

In the parking condition information generating part 410, it is preferable to generate an image signal for a map showing the parking space(s) near the position of the recognized wireless LAN mobile station 52 regardless of the availability of the parking space(s) or a map showing the available parking space(s).

The information signal 132 generated as described above is output from the system control part 404 to the IP network 90. The information signal 130 is then supplied to the wireless LAN base stations 20 and 22 via the interface part 18 and the connection line 112.

Specifically, from the wireless LAN base station 20, the information signal is transmitted to the wireless LAN mobile station 52 (step 536). The transmitted information signal is reproduced by a voice or displayed by an image in the mobile object 50 having the wireless LAN mobile station 52 so as to present (provide) the parking condition near the mobile object 50.

In the system 10, the generation and supply of the parking condition information signal may be terminated upon detecting the completion of the parking of the vehicle having the wireless LAN mobile station 52. For instance, since the position of the wireless LAN mobile station 52, i.e., the position of the vehicle 304 having the mobile object 50, can always be detected by the system control part 404 of the server 100, the completion of the parking of the vehicle 304 in the parking space 14 can be detected (determined) when the wireless LAN mobile station 52 arrives at the same position as the parking space 14 after approaching the parking space 14. At this moment, the parking condition of the parking space 14 is changed from the available parking space to the occupied parking space. Alternatively, the provision of the parking condition information may be terminated by a particular operation of the mobile object 50 by the user of the mobile object.

In the parking lot management system 10 of this embodiment, a software (not shown) providing (creating) the parking condition information may be installed in the mobile object 50. This software displays a selection image in a screen of the mobile object 50 in response to an operation made to the mobile object 50 by the user. The selection image, for example, asks the user to start or not creation of the parking condition information.

In this instance, when the start is selected by the operation of the mobile object 50, a signal requesting the parking condition information is supplied from the wireless LAN mobile station 52 to the server 100.

When the creation of the parking condition information starts, the parking condition information requesting signal is supplied from the server 100 to the wireless LAN mobile station 52, and to the mobile object 50, in response to the request signal of the parking condition information. The software can present (provide) the parking condition by displaying the image or by reproducing the voice of the parking condition information requesting signal supplied to the mobile object 50.

The software may also supply a signal showing the completion of the parking to the wireless LAN mobile station 52 so as to show the completion of the parking in the screen of the mobile object 50, when the completion of the parking of the vehicle having the wireless LAN mobile station 52 is detected by the server 100.

Figure 7:
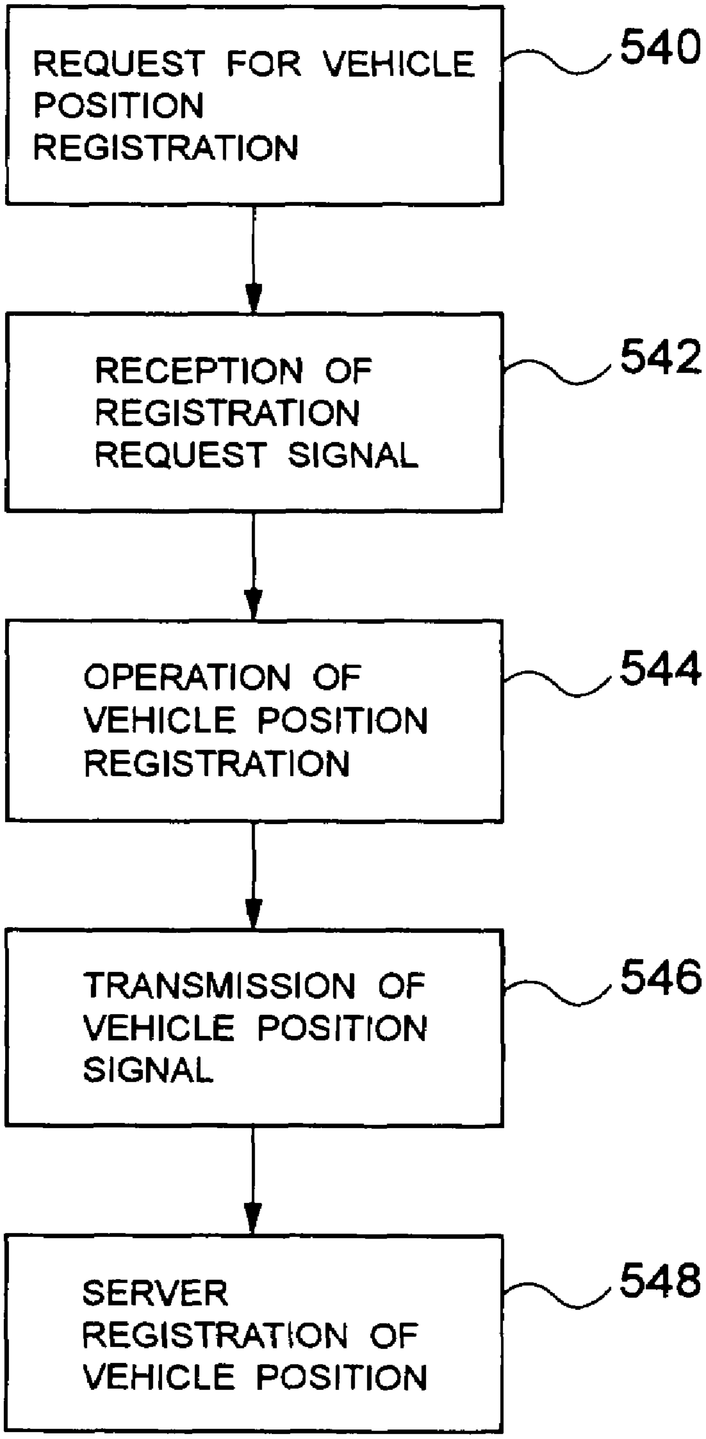
FIG. 7 is a flowchart illustrating an operating procedure to register a vehicle position in the embodiment of the parking lot management system shown in FIG. 1.

In the parking lot management system 10 of this embodiment, the position of the parked vehicle can be registered to the server 100, and the information of the registered vehicle position can be requested to the server 100 by using the wireless LAN system 120. Firstly, by referring to a flowchart of FIG. 7, an operation of the system 10 to register the vehicle position will be described.

In the system 10, as described above, when the completion of the parking of the vehicle having the wireless LAN mobile station 52 is detected by the server 100, a vehicle position registration request signal including the identification information of the wireless LAN mobile station 52 is generated in the vehicle position control part 412 of the system control part 404 so as to transmit the registration request signal to the wireless LAN mobile station 52 (step 540). The registration request signal 132 is output from the system control part 404 to the IP network 90. After passing through the IP network 90, the registration request signal 132 is supplied to the wireless LAN base stations 20 and 22 via the interface part 18 and the connection line 112.

From the wireless LAN base stations 20 and 22, the request signals are wirelessly transmitted to the respective transmittable and receivable areas 122 and 124, and are received by the wireless LAN mobile station 52 when the identification information of the request signal matches that of the wireless LAN mobile station 52 (step 542).

The request signal received by the wireless LAN mobile station 52 is, for example, reproduced by the voice or displayed by the image in the mobile object 50 so as to request the registration of the vehicle position. In this embodiment, the vehicle position is registered by an operation in the mobile object 50 in response to the request (step 544). The registration of the vehicle position may be registered by the operation in the mobile object 50 even though no request is made. From the mobile object 50, a vehicle position signal generated by the operation is supplied to the wireless LAN mobile station 52.

From the wireless LAN mobile station 52, the vehicle position signal is wirelessly transmitted (step 546) so as to be received by, for example, the wireless LAN base station 20. From the wireless LAN base station 20, the vehicle position signal is output to the IP network 90 via the connection line 112 and the interface part 18. After passing through the IP network 90, the vehicle position signal is supplied to the server 100.

In the server 100, the vehicle position signal 132 is supplied to the system control part 404. In the system control part 404, the vehicle position signal is controlled (processed) by the vehicle position control part 412 so as to be categorized based on the identification information of the wireless LAN mobile station 52. The vehicle position signal is then stored in the vehicle position memory device 414 in accordance with identification information (step 548).

Figure 8:
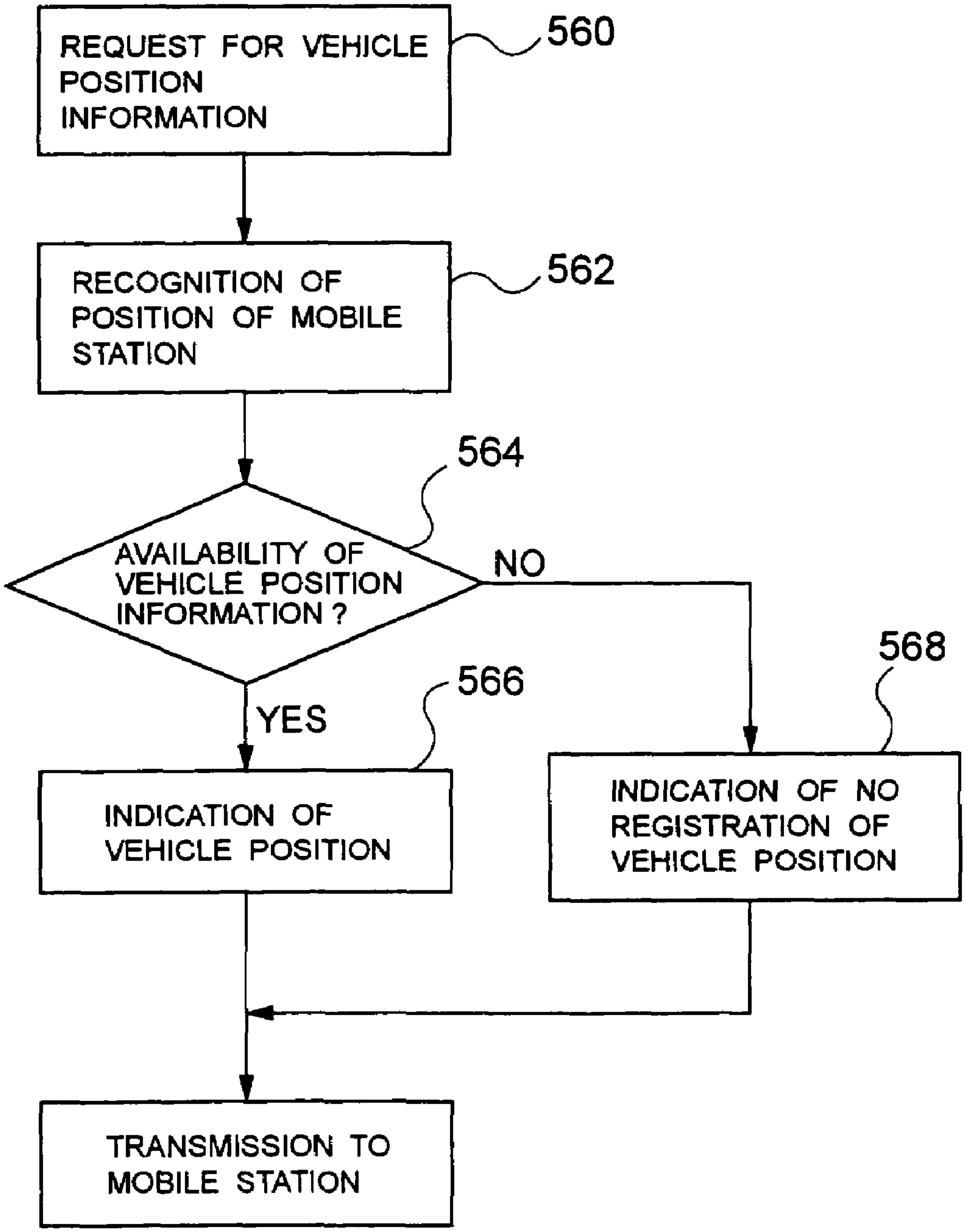
FIG. 8 is a flowchart illustrating an operating procedure to obtain vehicle position information in the embodiment of the parking lot management system shown in FIG. 1.

Next, by referring to a flowchart in FIG. 8, an operation of the system 10 to provide the vehicle position information will be described.

In the system 10, when an operation is made to the mobile object 50 within the parking lot 12, a signal requesting information of the vehicle position is generated and transmitted. The vehicle position information requesting signal including the identification information of the wireless LAN mobile station 52 is wirelessly transmitted from the wireless LAN mobile station 52 in the mobile object 50 (step 560).

The request signal is received by, for example, the wireless LAN base station 20 positioned within a transmittable and receivable area of the wireless LAN mobile station 52. The request signal received by the wireless LAN base station 20 is output to the IP network 90 via the connection line 112 and the interface part 18. After passing through the IP network 90, the request signal is supplied to the server 100.

In the sever 100, the request signal 132 is supplied to the vehicle position control part 412 of the system control part 404. The vehicle position control part 412 determines (confirms) the position of the wireless LAN base station 20 supplying the request signal based on the identification information of the wireless LAN mobile station 52 included in the request signal. The position of the wireless LAN mobile station 52 transmitting the request signal is then recognized (step 562).

The vehicle position control part 412 retrieves the vehicle position from the vehicle position memory device 414 based on the identification information of the wireless LAN mobile station 52 included in the request signal (step 564). When the vehicle position based on the identification information of the wireless LAN mobile station 52 is memorized in the vehicle position memory device 414, the flowchart goes to step 566. On the other hand, when the vehicle position is not memorized, the flowchart goes to step 568.

In step 566, a guide signal such as a voice signal or an image signal indicating the vehicle position relative to the wireless LAN mobile station 52 is generated in the vehicle position information generating part 416 based on the recognized position of the wireless LAN mobile station 52 and the retrieved vehicle position.

Specifically, when the wireless LAN mobile station 52 is positioned within a predetermined distance from the vehicle, it is preferable to generate a voice signal about the vehicle position such as "10 m to the vehicle". On the other hand, when the wireless LAN mobile station 52 is not positioned within the predetermined distance, it is preferable to generate a voice signal indicating the parking lot zone including the vehicle position. In the vehicle position information generating part 416, an image signal of a map or the like showing a parking space near the position of the recognized wireless LAN mobile station 52 or the vehicle position may be generated.

Furthermore, a guide signal may be generated in the vehicle position information generating part 416 which turns on lighting systems respectively provided at the parking spaces 14 and 16. In this instance, it is preferable to generate the guide signal in the vehicle position information generating part 416 which turns on or blinks the light systems, when the wireless LAN mobile station 52 is positioned within the predetermined distance from the vehicle.

In the parking lot management system 10 of this embodiment, a software (not shown) may be installed in the mobile object 50. The software registers the vehicle position and shows the registered vehicle position. This software, for example, displays a registration image for registration of the vehicle position in response to an operation made to the mobile object 50.

The registration image may be prepared (presented) by the software in response to an operation made to the mobile object 50, or may be prepared in response to the detection of the completion of the parking by the above-described software providing the parking condition.

When the vehicle position is registered by the operation of mobile object 50 in accordance with instructions of the registration image, a vehicle position signal is generated. The vehicle position signal is supplied from the wireless LAN mobile station 52 to the server 100 for registration.

This software also displays a selection image which asks the user to start or not the vehicle position information preparation. When the start is selected by the user operating the mobile object 50, a signal requesting the vehicle position information is generated and supplied from the wireless LAN mobile station 52 to the server 100.

This software can provide the user with the vehicle position information by displaying an image or by reproducing a voice of the vehicle position information signal in the mobile object 50 when the vehicle position information signal is supplied from the server 100 to the mobile object 50 via the wireless LAN mobile station 52.

The parking lot management system 10 may perform like an ETC (Electronic Toll Collection) system for the parking lot by using the wireless LAN base stations provided at the entrance and the exit of the parking lot 12, so that temporary stop when entering or exiting the parking lot for the measurement of the entering time or the exiting time can be avoided. This will be described below.

The wireless LAN base stations provided at the entrance and the exit of the parking lot 12 wirelessly transmit a signal requesting the identification information of the wireless LAN mobile station when the vehicle enters and exits the parking lot. The request signal may be transmitted within an area where only one vehicle can receive the signal.

In response to the request signal, the wireless LAN mobile station in the vehicle wirelessly transmits a wireless signal showing the identification information to the wireless LAN base station. The wireless LAN base station outputs the received identification information signal to the IP network 90 via the connection line 112 and the interface part 18. After passing through the IP network 90, the identification information signal 132 is supplied to the server 100.

In this instance, the wireless LAN mobile station is recognized in the server 100 based on the identification information signal, and the entering time or the exiting time is registered to a database (not shown) per each wireless LAN mobile station. It is preferable that the server 100 outputs control signals for opening gates or the like provided at the entrance and the exit of the parking lot based on the identification information. The control signals for opening the gates may be output when the wireless LAN base stations provided at the entrance and the exit of the parking lot recognize the identification information of the wireless LAN mobile station.

In the parking lot management system 10 of this embodiment, when the vehicle having the wireless LAN mobile station exits the parking lot, registration of the entering time corresponding to the identification information of the wireless LAN mobile station in the database of the sever 100 is checked. When the entering time is registered, the exiting time using the same identification information as the entering time may be registered to the database and managed.

In the parking lot management system 10 of this embodiment, the wireless LAN mobile station may generate a signal requesting information of a parking time, a parking fee and the like, and supply the request signal to the server 100. In this instance, the server 100 may calculate and prepare information about the parking time and the parking fee as of the present time based on the parking lot entering time of the wireless LAN mobile station and the present time. The server 100 may supply the signal representing the information to the wireless LAN mobile station.

In the parking lot management system 10, a plurality of wireless LAN base stations may also be installed at, for example, stores or railway stations which ties up with the parking lot 12. Accordingly, the information such as the parking time and the parking fee may be supplied to the wireless LAN mobile stations at the stores or the railway stations. When the parking fee is reduced in accordance with shopping at the store, shopping information may be transmitted from the wireless LAN mobile stations to the server 100 so as to register the reduction of the fee.

The server 100 may calculate and prepare information about the parking time and the parking fee based on the entering time and the exiting time of the wireless LAN mobile station, and then charge the parking fee to an owner of the wireless LAN mobile station.

The system using the sever and the wireless LAN system according to the present invention can be applied not only to the parking lot but also to other large facilities. The system can effectively manage information about the facility and can offer necessary information for users in the facility. Furthermore, user-related information within the facility can be registered and managed by the system. For example, in a facility having a large number of seats such as a theater, information about each seat may be provided to the user, and the fee may be adjusted based on the information about entering and exiting of the user. In a facility having many spaces such as a warehouse, effective warehousing can be achieved by managing the information about each space and by offering the information.

This application is based on a Japanese patent application No. 2003-319317, the entire disclosure of which is incorporated herein by reference.

What is claimed is:

1. A parking lot management system comprising:

a sever for managing parking information about a parking lot having a plurality of parking spaces;

a plurality of wireless LAN base stations installed in the parking lot for wirelessly transmitting and receiving the parking information, each of the plurality of wireless LAN base stations having a transmittable and receivable area, the plurality of wireless LAN base stations forming a wireless LAN system such that each of the plurality of wireless LAN base stations can wirelessly connect to a wireless LAN mobile station of a mobile object when the mobile object exists in its own transmittable and receivable area; and communication means for communicating the parking information between the plurality of wireless LAN base stations and the server via an IP network operating with internet protocol, a plurality of parking condition detection devices respectively corresponding to the plurality of parking spaces, wherein the wireless LAN mobile station and the server can communicate the parking information through the wireless LAN system and the communication means, wherein the wireless LAN mobile station of the mobile object has unique identifying information, and accepts or rejects an incoming wireless signal depending on whether identification information in the incoming wireless signal matches the unique identifying information, wherein parking space identification information is provided at each parking space to identify the respective parking space, wherein each of the plurality of parking condition detection devices includes parking condition detecting means for detecting a parking condition showing whether the corresponding parking space is occupied or not by a vehicle, and outputs a parking condition signal showing the parking condition, the parking condition detecting means including an optical sensor, and the parking condition information signal indicating that the corresponding parking space is not occupied by a vehicle if the optical sensor can sense the parking space identification information that is provided at the corresponding parking space and indicating that the corresponding parking space is occupied by a vehicle if the optical sensor cannot sense the parking space identification information that is provided at the corresponding parking space, wherein the server includes parking condition registration means for identifying and registering the parking condition signal per each parking space, wherein the wireless LAN system is configured such that each of the plurality of wireless LAN base stations is wirelessly connected to the corresponding parking condition detection devices within its own transmittable and receivable area, and wherein the parking information is communicated between the plurality of parking condition detection devices and the server through the wireless LAN system and the communication means, and the parking condition signal is supplied to the server so as to be registered by the parking condition registration means.

2. The parking lot management system according to claim 1, wherein the server periodically outputs a parking condition detection request signal, which requests detection of the parking condition, to each of the plurality of parking condition detection devices through the wireless LAN system and the communication means, and each of the parking condition detection devices detects the parking condition in response to the parking condition detection request signal.

3. The parking lot management system according to claim 1, wherein the parking space identification information comprises a barcode.

4. The parking lot management system according to claim 1, wherein the server includes parking condition information generating means for extracting the registered parking condition signal and for generating a parking condition information signal which indicates the parking condition, and the server supplies the parking condition information signal to the wireless LAN mobile station through the wireless LAN system and the communication means.

5. The parking lot management system according to claim 4, wherein the mobile object generates a parking condition information request signal requesting parking condition information and supplies the parking condition information request signal to the wireless LAN mobile station, the parking condition information generating means generates the parking condition information signal in response to the parking condition information request signal, and the parking condition information request signal is supplied from the wireless LAN mobile station to the server through the wireless LAN system and the communication means.

6. The parking lot management system according to claim 5, wherein the server detects a certain number of parking spaces near the wireless LAN mobile station in response to the parking condition information request signal, and the parking condition information generating means extracts the parking condition signals respectively corresponding to the certain number of parking spaces and generates the parking condition information signals.

7. The parking lot management system according to claim 4, wherein the parking condition information signal includes a voice signal which indicates a non-occupied parking space by voice.

8. The parking lot management system according to claim 7, wherein the mobile object has software to produce the voice in response to the voice signal.

9. The parking lot management system according to claim 4, wherein the parking condition information signal includes an image signal which displays a map near the wireless LAN mobile station and indicates a non-occupied parking space in the displayed map.

10. The parking lot management system according to claim 9, wherein the mobile object has software to display the map and the non-occupied parking space in response to the image signal.

11. The parking lot management system according to claim 1, wherein the server includes vehicle position registration means for identifying and registering a vehicle position signal, which shows a vehicle position, in connection with the wireless LAN mobile station, the mobile object generates the vehicle position signal and supplies the vehicle position signal to the wireless LAN mobile station, and the vehicle position signal is supplied from the wireless LAN mobile station to the server through the wireless LAN system and the communication means.

12. The parking lot management system according to claim 11, wherein the server includes vehicle position information generating means for extracting the registered vehicle position and for generating a vehicle position information signal which indicates the vehicle position, and the vehicle position information signal is supplied from the server to the wireless LAN mobile station through the wireless LAN system and the communication means.

13. The parking lot management system according to claim 12, wherein the mobile object generates a vehicle position information request signal requesting vehicle position information and supplies the vehicle position information request signal to the wireless LAN mobile station, the vehicle position information generating means generates the vehicle position information signal in response to the vehicle position information request signal, the vehicle position information request signal is supplied from the wireless LAN mobile station to the server through the wireless LAN system and the communication means.

14. The parking lot management system according to claim 13, wherein the vehicle position information signal includes a voice signal which indicates the vehicle position by voice.

15. The parking lot management system according to claim 14, wherein the mobile object has software to prepare and utter the voice to indicate the vehicle position in response to the voice signal.

16. The parking lot management system according to claim 12, wherein the vehicle position information signal includes an image signal which displays a map near the wireless LAN mobile station and indicates the vehicle position.

17. The parking lot management system according to claim 16, wherein the software displays the map and the vehicle position in response to the image signal.

18. The parking lot management system according to claim 12, wherein the plurality of parking spaces respectively has lighting systems to indicate the vehicle position, the vehicle position information signal includes a lighting control signal to indicate the vehicle position by activating one of the plurality of lighting systems, the wireless LAN system is configured such that the plurality of wireless LAN base stations are wirelessly connected to the plurality of lighting systems within the respective transmittable and receivable areas, the lighting control signal is supplied from the server to the one of the plurality of lighting systems through the wireless LAN system and the communication means, and the one of the plurality of lighting systems are activated in response to the lighting control signal.

19. The parking lot management system according to claim 1, wherein additional wireless LAN base stations are provided at an entrance and an exit of the parking lot, the wireless LAN system is configured such that the wireless LAN base stations provided at the entrance and the exit are wirelessly connected to the mobile object within respective transmittable and receivable areas so as to detect entering or exiting of the wireless LAN mobile station into and from the parking lot, an entering signal and an exiting signal showing the entering and the exiting of the wireless LAN mobile station are generated by the wireless LAN base stations provided at the entrance and the exit, the entering signal and the exiting signal is supplied to the server by the communication means, and the server detects entering time and exiting time based on the supplied entering signal and the exiting signal, so that the entering time is identified and registered in connection with the wireless LAN mobile station, and that the exiting time is identified and registered in connection with the wireless LAN mobile station having the registered entering time.

20. The parking lot management system according to claim 19, wherein the wireless LAN mobile station generates a parking time request signal requesting a presentation of a parking time and/or a parking fee, the parking time request signal is supplied to the server through the wireless LAN system and the communication means, the server extracts the entering time in response to the parking time request signal, and calculates the parking time and the parking fee based on the entering time and present time, so as to generate a parking time information signal presenting the parking time and the parking fee, and the parking time information signal is supplied from the server to the wireless LAN mobile station through the wireless LAN system and the communication means.

21. The parking lot management system according to claim 20, wherein at least one more wireless LAN base stations is provided at a store which ties up with the parking lot so that the parking information can be communicated at the store.

22. The parking lot management system according to claim 1, wherein the mobile object is a portable communication device.

23. The parking lot management system according to claim 22, wherein the portable communication device is a telephone.

24. The parking lot management system of claim 1, wherein the mobile object is a portable communication device carried by a driver of a vehicle, and wherein the server stores position information about the vehicle when the vehicle is parked based on the identification information.

25. The parking lot management system according to claim 1, wherein the incoming wireless signal supplies information from the server about available parking spaces that are near the mobile object.

* * * * *